3,074,897
AQUEOUS ALKALINE ADHESIVE COMPRISING PHENOL-FORMALDEHYDE CONDENSATE AND HOMOPOLYMERS OF ETHYLENE OXIDE
Edgar Bradbury Baker, Seattle, Wash., assignor to The Borden Company, New York, N.Y., a corporation of New Jersey
No Drawing. Filed Feb. 17, 1960, Ser. No. 9,192
4 Claims. (Cl. 260—29.3)

This invention relates to phenolic resin compositions including a spreading promoter and particularly to such compositions in form suitable for use as adhesives.

The spreading promoter is a high molecular weight homopolymer of ethylene oxide, sometimes referred to herein as Polyox.

Such polymers have been used heretofore as thickeners in various compositions. I find however an enormously greater increase in the viscosity produced by the use of such polymer in the alkali-dissolved phenol formaldehyde resin compositions than would be expected from the known effect of the polymer material when dissolved in water alone. Using Polyox WSR-35, for example, I have found that about 0.25% concentration in a formaldehyde phenol resin solution increases the viscosity by 1635 centipoises above that for the said resin solution without the Polyox added, that is from 265 up to 1900 cps. at 25° C. This same Polyox WSR-35, when used alone in water in concentration 5% by weight, on the other hand, gives a solution of viscosity only about 225-375 cps. at the same temperature.

Briefly stated, the present invention comprises a resinous condensate of formaldehyde with a phenol, aqueous alkali in amount to dissolve the condensate, and a minor proportion of a very high homopolymer of ethylene oxide admixed in amount to improve the spreading of the aqueous composition when used as a glue over a surface that is to be bonded by the composition.

The phenol used in making the resin is ordinarily phenol $C_6H_5OH$ but may be meta-cresol or 3,5-xylenol. In making this resinous condensate, the formaldehyde is ordinarily used in the proportion of about 1.5–2.5 moles for 1 mole of the selected phenol.

The polymer of ethylene oxide may be any one of the homopolymers of viscosity varying from about 225 centipoises at 5% concentration in water solution, measured at 25° C., up to 4,000 cps. for a 1% solution with the viscosity tested in comparable manner, suitably with a Brookfield viscosimeter.

Examples of such polymers that may be used are those known by the names Polyox of any one of the following grades WSR-35, WSR-205 and WSR-301. These materials in molten conditions have viscosities at 150° C. within the range 15,000–110,000 poises. Their molecular weights are approximately as follows: WSR-35, 200,000; WSR-205, 500,000; and WSR-301, 3,500,000. All of these homopolymers of ethylene oxide are soluble in water, the solubility being more rapid and greater the lower the viscosity of the grade selected.

The alkali metal alkali which is used as the agent in the condensation of the formaldehyde with the selected phenol, as also in the subsequent thinning and processing of the condensate first formed, is any one of the alkalies commonly used in condensation of the aldehyde and the phenol. Examples are the hydroxides and carbonates, the hydroxides being recommended for economy and convenience in association with sodium, as in sodium hydroxide.

Other components that are conventional in adhesives for the plywood industry or the like may be and suitably are included in usual amount and for usual effects. These include the fillers such as walnut shell flour, pulverized Douglas fir bark, wood flour, clay, and Furafil (ground oat hulls that have been processed with acid in the manufacture of furfural).

Water is used as the medium in which the phenol aldehyde resin is dissolved in contact with the alkali.

Proportions that are permissible and that are recommended for commercial use are shown in the following table.

| Component | Permissible | Recommended |
|---|---|---|
| Phenol:formaldehyde, molar ratio | 1:1.5–1:2.5 | 1:1.8–1:2.2 |
| Phenol: caustic soda, molar ratio | 1:0.4–1:1 | 1:0.7–1:0.83 |
| Resin solids content, percent of solution | 30–60 | 35–50 |
| Polymer of ethylene oxide, percent of resin solution | 0.005–0.25 | 0.01–0.1 |
| Water to give concentration desired. | | |

A suitable proportion of the alkali metal alkali is 20–50 parts by weight for 100 parts of the selected phenol.

As to conditions I find a particularly effective adhesive to be produced when the phenol and the aldehyde are first condensed at an elevated temperature such as 85°–90° C., in contact with aqueous sodium hydroxide as the condensation agent, until the viscosity becomes about 100 to 200 cps. measured at a temperature of 25° C., the whole then being cooled slowly as to a temperature within the range approximately 50°–85° C. until the viscosity increases to 350 to 350 cps., measured at 25° C. Then there is incorporated additional sodium hydroxide or like alkali to thin the whole mixture, after which it is reheated again to raise the viscosity to about 500 to 2000 cps. The spreading promoter may be introduced either before the condensation is initiated, at any stage during the processing in the general manner described, or after the condensate has been made and processed as described to the final, cooled condition.

The invention will be further illustrated by description in connection with the following specific examples, proportions here and elsewhere herein being expressed as parts by weight unless specifically stated to the contrary and all viscosities are measured at 25° C. except when shown otherwise.

*Example 1*

The phenolic resin is made from the following materials.

Materials: Parts
87% phenol _____ 1078
37% formaldehyde solution (0.7% methanol) _____ 1660
Additional water _____ 410
50% sodium hydroxide solution _____ 350

Total weight _____ 3498

Total water used, approximately _____ 1760

The mixture is agitated and heated under a reflux condenser to 90° C. in the course of 1 hour. It is then cooled slowly over a two hour period to 75° C. and to a Gardner-Holdt viscosity of "T" (550 centipoises).

The product was then cooled rapidly as in about 15–30 minutes to about 25° C.

The glue solution was made of the following composition.

| Component: | Parts |
|---|---|
| Above resin solution | 1625 |
| 50% sodium hydroxide solution | 39 |
| Additional water | 97 |
| 10% Polyox WSR-35 solution | 12 |
| 50% caustic soda solution | 85 |
| Total weight | 1858 |
| Total water in glue | 965 |

The water content given in the tabulations above is approximate, as there is some evaporation that cannot be avoided, and some water is formed during condensation.

In making the glue solution, the resin solution, the 39 parts of sodium hydroxide solution, the 97 parts of additional water and the Polyox solution were mixed and heated at 70°–79° C. to Gardner-Holdt viscosity "U" in the course of about 90 minutes. Then the 85 parts of sodium hydroxide solution were admixed and the whole condensed again at 83°–85° C. to a Gardner-Holdt viscosity "T." The resulting mixture was then cooled rapidly as before to room temperature. Additional water in the amount of 150 parts was added to reduce the viscosity to 440 cps. at 21° C. for further compounding into the finished commercial glue.

The commercial glue mix was then made as follows; with the various components being added in the order shown.

| Component: | Parts |
|---|---|
| Water | 150 |
| Furafil | 70 |
| (The above mixed two minutes) | |
| 50% sodium hydroxide solution | 30 |
| (The above now mixed 2 minutes) | |
| Sodium carbonate | 15 |
| (Mixed 20 minutes, then cooled) | |
| Phenolic glue made as above with Polyox | 500 |

The whole was then mixed for 5 minutes. The viscosity of the final mixture at 21° was 705 cps.

In a control preparation, the Polyox was omitted and also the dilution by the 150 parts of water towards the end of the processing. In spite of the greater concentration of solids, the viscosity of the finished, control product was only 290 cps.

*Example 2*

Another resin of somewhat different composition and processing was made as follows.

Materials:

(1) Parts, gms.

| | |
|---|---|
| 87% phenol | 1392 |
| 37% formaldehyde | 2064 |
| Water | 60 |
| 50% caustic soda | 272 |

(2)

| | |
|---|---|
| 50% caustic soda | 332 |
| Total | 4120 |

*Procedure.*—Charge (1) to 5 liter, 3-necked flask equipped with agitator and reflux condenser that can be heated or cooled as desired. Heat is applied so as to raise it to 90° C. in the course of 15–30 minutes. Hold at 90° to a Gardner "E." At this point it is cooled slowly while viscosity checks are made at about 15 minute intervals. When a Gardner "Q-R" is reached at about 75° C., (2) is charged which thins the batch. The temperature is raised to 75–80° C. until "Q-R" is again reached. The batch is cooled to reach a Gardner "U" at about 70° C. The batch is then cooled rapidly to room temperature.

Two batches are made and blended.

Data follow:

| | |
|---|---|
| pH at 21° C | 10.7 |
| Solids percent | 48.6 |
| Viscosity at 21° C cps | 700 |

At the time of preparation of the glue mixes below, the resin viscosity is 1000 cps.

| Glue Mix | A, gms. | B, gms. |
|---|---|---|
| Water | 100 | 100 |
| 50% Caustic soda | 40 | 40 |
| Soda ash | 25 | 25 |
| | Mix 2 minutes | |
| Walnut shell flour | 100 | 100 |
| | Mix 3 minutes | |
| Above resin | 500 | 500 |
| | Mix 5 minutes | |
| Polyox WSR-35 in Water | { 1 | 0 |
| | 49 | 49 |
| | Mix 5 minutes | |

The final mixed glue viscosity at 21° C., 1 hour after mixing was 1900 for A and 265 for B.

It is calculated that the one part of Polyox WSR-35 in the Formula A corresponds to approximately 0.25% of the weight of water in the glue A. The large effect upon the viscosity is noted.

*Example 3*

In a modification of the invention, the phenolic resin is made from the following materials.

| Materials: | Parts |
|---|---|
| (1) 97% phenol | 1215 |
| (2) 37% CH$_2$O (0.7% methanol) | 1805 |
| (3) Water | 700 |
| (4) 50% caustic soda | 423 |
| (5) 0.7 polyox WSR-35 in water to make | 70.7 |
| Total | 4213.7 |

*Manufacturing procedure.*—Mix (1) through (4). Allow to come to 90° C. in about 1 hour. Hold at about 90° C. to Gardner-Holdt viscosity "E–G." Cool slowly in another 1–3 hours to reach Gardner-Holdt "T." Admix (5). Cool rapidly below 2° C. The product has a viscosity of 570 cps., pH 10.8, and solids content 39.8%.

The glue composition made as described was tested for bonding wood veneers under the conditions and with the results shown below.

*Conditions.*—Assembly time 5–30 minutes. Press temperature 300° F. Moisture in wood bonded 2%–5%. Spread 22.5 lbs. glue/1000 sq. ft. of glue line. Face veneer, thickness ⅛ in., core ⅜₆ in. Pressed—2 panels per press opening.

Results:

| Press Time, Min. | Boiling Water Test (CS-45-55) | |
|---|---|---|
| | Shear Force, p.s.i. | Wood Failure on Separation, percent |
| 9 min | 162 | 97 |
| 8½ min | 166 | 93 |
| 8 min | 161 | 92 |

I have discovered that the Polyox additives are more effective in increasing the spread of the glue with higher phenol-formaldehyde resins, such as those shown in Examples 1, 2 and 3, than with the lower condensation products.

*Example 4*

The procedure and compositions of Examples 1, 2, and 3 are used in turn except that the Polyox WSR-35 is replaced first by Polyox WSR-205 and Polyox WSR-301, the proportions thereof being made of 0.15% and 0.1%, respectively, of the weight of the water in the adhesives. The products are adhesives of good spreading properties.

It will be understood that it is intended to cover all changes and modifications of the examples of the invention herein chosen for the purpose of illustration which do not constitute departures from the spirit and scope of the invention.

I claim:

1. An adhesive composition comprising an aqueous solution of the alkali soluble resinous condensation product of formaldehyde with a phenol selected from the group consisting of phenol, m-cresol and 3,5-xylenol in the proportion of about 1.5–2.5 moles of the formaldehyde to 1 mole of the selected phenol, an alkali metal alkali and a homopolymer of ethylene oxide of molecular weight within the range 200,000–3,500,000, the said homopolymer being a spreading promoter for the adhesive composition and the proportions by weight being approximately 20–50 parts of the alkali metal alkali for 100 parts of the selected phenol and 0.005–0.25 part of the homopolymer for 100 parts of the said solution.

2. The adhesive of claim 1 the selected phenol being of the formula $C_6H_5OH$.

3. The adhesive of claim 2, the said alkali being sodium hydroxide.

4. The adhesive of claim 2 containing admixed finely divided solid filler.

References Cited in the file of this patent

UNITED STATES PATENTS

| | | |
|---|---|---|
| 2,300,074 | Strain | Oct. 27, 1942 |
| 2,868,741 | Chambers et al. | Jan. 13, 1959 |
| 2,889,241 | Gregory et al. | June 2, 1959 |
| 3,025,255 | Lambuth | Mar. 13, 1962 |

OTHER REFERENCES

De Bruyne et al.: "Adhesion and Adhesives," Elsevier Pub. Co., New York (1951), page 228.

Union Carbide Chemicals Company, "Physical Properties of Synthetic Organic Chemicals," Bulletin F–6136L (1958), page 24.